July 25, 1967     L. P. MULLER ET AL     3,333,034

CASTING PROCESS

Filed Nov. 10, 1965

INVENTORS
L. PHILIP MULLER
JOHN W. BENZ JR.
PAUL R. SCHAEFFER

BY *Richard O. Church*

ATTORNEY

United States Patent Office 3,333,034
Patented July 25, 1967

3,333,034
CASTING PROCESS
Louis P. Muller, Wyomissing, John W. Benz, Jr., Douglasville, and Paul R. Schaeffer, West Chester, Pa., assignors to The Polymer Corporation, Reading, Pa., a corporation of Pennsylvania
Filed Nov. 10, 1965, Ser. No. 507,181
4 Claims. (Cl. 264—39)

This application is a continuation-in-part of our copending application Ser. No. 258,780, filed Feb. 15, 1963, and now abandoned.

This invention relates to casting nylon articles by charging mold cavities with reactive lactams and polymerizing such lactams in situ in the mold. More particularly, this invention is concerned with methods and means for obtaining smooth surfaces on cast polyamide articles prepared by using methods for the low temperature anionic polymerization of higher lactams. As used in this specification and the attached claims, the terms "cast" and "casting" shall relate to shape formation at substantially atmospheric pressures and the products that result therefrom; and the term "low temperature polymerization" shall be used to designate polymerizations that are conducted below the melting point of the resultant polymerized product.

In casting polyamide articles at substantially atmospheric pressures by the in situ low temperature polymerization methods, surface defects on the castings caused by gases entrapped within the mold cavity often are observed. Such gas entrapment may be patricularly troublesome adjacent high points and undercut portions of the mold cavity, although it may also occur along any of the side walls of the mold to a lesser degree. This problem is not as acute in casting metals since the density of molten metals is generally many times greater than that of the lactams with which this invention is concerned. As a result, the gravity forces exerted by the molten metals against the surfaces of the mold cavity are more effective in displacing gases from the mold. Also, for similar reasons, it can be appreciated that gas entrapment is not a consequential problem when pressure molding techniques are used.

Accordingly, it is a principal object of this invention to provide methods and means for casting polyamide articles by the in situ low temperature anionic polymerization of lactams whereby such cast articles will have smooth, defect-free surfaces.

Briefly, this object is achieved by purging mold cavities with volatile or gaseous materials that are soluble in lactam monomer prior to charging such molds with the monomer. By this means, the less soluble gases of the atmosphere are displaced with a gas that is readily absorbed by the lactam monomer. This enables the production of a cast article that is relatively free from surface faults caused by the entrapment of gases within the mold.

The low temperature anionic polymerization of lactams referred to above is disclosed, for example, in U.S. Patents 3,015,652, 3,017,391, 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentadecanolactam, hexadecanolactam; methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organometallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds such as ethyl magnesium chloride, methyl magnesium bromide, phenyl magnesium bromide and the like; and a promoter compound such as organic isocyanates, ketenes, acid chlorides, acid anhydrides, and N-substituted imide having the structural formula

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1000.

The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms and more preferably contain from 6 to 12 carbon atoms. The anionic catalyst preferably is a Grignard compound of an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids in the system which then require sufficient anionic catalyst to neutralize the organic acid in addition to the amount desired to function in the polymerization reactions.

The temperatures at which these polymerization reactions may be initiated may vary within a wide range of from about the melting point of the lactam monomer to a temperature in considerable excess of the melting point of the lactam polymer, e.g., 250° C. In the practice of this particular invention, however, it is desired to avoid the molten phase of the polylactam during polymerization since the casting process is simplified in that it may be conducted substantially at atmospheric pressure and, if desired, in open molds. On the other hand, if the melting point of the polylactam is exceeded, high pressure molding techniques are generally required to avoid bubbles and voids that may be caused by volumetric shrinkage during solidification. Other advantages also accrue if the melting point of the polylactam is not exceeded in that a greater conversion of monomer to polymer is obtained and the crystallinity and certain physical properties are improved.

The polymerization reaction with which this invention is concerned is exothermic and, accordingly, the initiation temperature usually will be exceeded during the polymerization. For this reason, if it is desired to stay below the melting point of the polymer, the reaction should be initiated at temperatures somewhat below the melting point of the polymer. For example, in the case of epsilon-caprolactam, when the polymerization is initiated at temperatures between about 150–190° C., the exotherm of the reaction will generally cause the polymerizing mass, under adiabatic conditions, to increase in temperature by about 30°. Since the melting point of polyepsilon-caprolactam is about 215° C.±10° and since it begins to soften at about 205° C., the polymerization reaction should be initiated, in order to avoid the molten phase of the polycaprolactam, below about 175° C. and preferably at about 160° C. In this latter instance, that is, initiation at 160° C., the exotherm of the reaction will carry the reacting mass, under adiabatic conditions, to about 190° C., and the melting or softening point of the polyepsilon-caprolactam will be safely avoided. The use of initiation temperatures in this range is also advantageous in that they are sufficiently high to enable the reaction to proceed with rapidity while being sufficiently low enough to allow substantially complete conversion from monomer to polymer.

Figure 1:
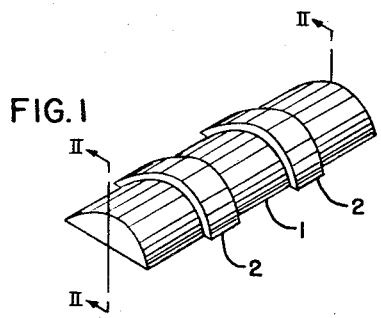
FIGURE 1 is a perspective view of a cast article made in accordance with this invention.
Figure 2:
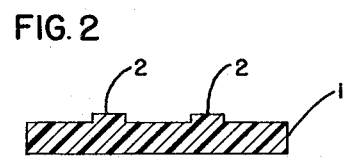
FIGURE 2 is a view taken along section line 2—2 of FIGURE 1.

Referring to FIGURES 1 and 2, there is shown a curved structure 1 having raised curved portions 2. When this article is cast in a vertically disposed mold 11, as shown in FIGURE 3, air may become entrapped at the undercut portions 12 of the mold.

Figure 3:
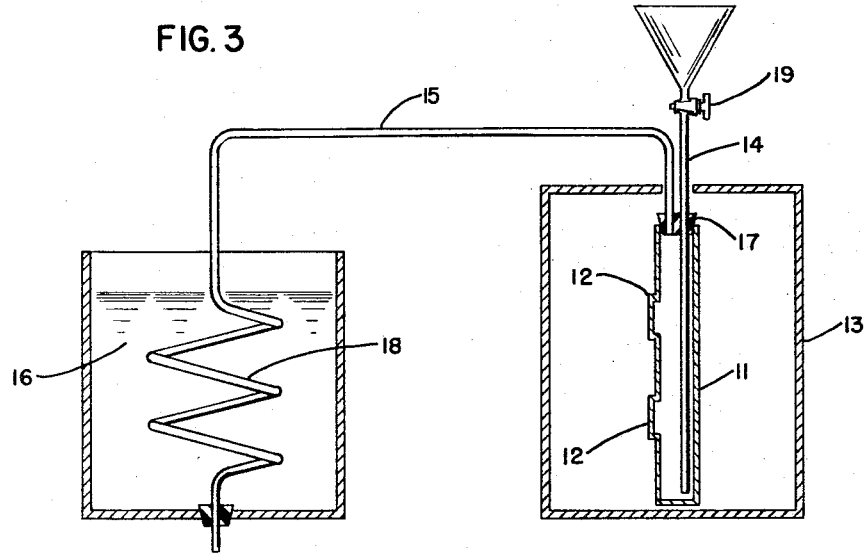
FIGURE 3 is a schematic drawing, partially in section, showing means for accomplishing the objects of this invention.

In FIGURE 3 there is also shown a schematic representation of an oven 13, adapted to contain the mold 11. Filling device 14, valved as at 19, communicates from the outside of the oven 13 to a point within the mold cavity 11, preferably adjacent the lower portion of the mold.

A vent line 15 is provided that communicates between a point adjacent the upper portion of the mold cavity to a cooling coil 18 immersed in a liquid bath 16. Except for access via vent line 15 and filling device 14, the cavity of the mold is closed to the atmosphere by means of sealing device 17, here illustrated as a two hole stopper.

In utilizing this device in the practice of the invention, a volatile material that is soluble in the lactam monomer is charged into the mold 11 by means of filling device 14. Valve means 19 is shut and the temperatures within oven 13 cause the volatile material to volatilize and leave the mold 11 by way of vent line 15 and cooling coil 18. While cooling coil 18 and liquid bath 16 are desired for purposes of condensing and recovering the volatile material for reuse, it is to be understood that this is not necessary in the practice of this invention. After the mold has been purged of air by volatilization of the volatile material, valve 19 is opened and a reactive lactam is introduced into the mold via filling device 14. The temperature within the oven is sufficient to initiate the polymerization. Prior to substantial polymerization, however, substantially all of the volatile material remaining in the mold cavity is absorbed from the surface of the interior of the mold and particularly undercut sections 12. By these means, the liquid lactam is not prevented from contacting the entire surface areas of the mold and a casting free from surface defects is produced.

The material selected for purging the mold should not only be highly volatile and soluble in the monomer, but also should be compatible with the above polymerization system. While it may quite generally be said that oxidants and compounds containing active hydrogen and hydroxyl groups will interfere with the discussed low temperature anionic polymerization processes, the compatibility of a given purging agent with the reaction must be determined with respect to the specific catalyst and promoter used in the polymerization as well as with respect to the quantity of purging agent that remains in the mold after it has been volatilized. As a class, the lower chain ketones are preferred as purging agents due to their high volatility, their solubility in the monomer, and their compatibility with the anionic polymerization reaction. More specifically, acetone is quite satisfactory as a purging agent and methyl ethyl ketone is acceptable.

*Example*

A mold was prepared similar to the one shown in FIGURE 3 and inserted in an oven heated to about 180° C. The mold was partially filled with acetone via a filling tube and the acetone was allowed to volatilize and escape from the mold via a vent line. After the acetone had been volatilized, the mold was filled with epsilon-caprolactam preheated to a temperature of about 160° C. The lactam was prereacted with a 1/200 molar quantity of tolylene diisocyanate initiator and 1/400 molar quantity of sodium hydride catalyst.

The polymerization reaction proceeded at atmospheric pressures within the mold and after a period of 2 or 3 minutes, the polymerization was complete with a resulting solid cast article having a shape similar to the one shown in FIGURE 1. The maximum temperature reached by the polymerizing mass was 190° C.

The raised portions of the casting were free from imperfections as were the other surfaces. When the same experiment was repeated without purging with acetone, surface imperfections and voids were quite noticeable, particularly at the areas of the casting conforming to the undercut portion of the mold.

We claim:

1. A method for casting shaped polylactam articles by forming such article during the low temperature anionic polymerization of a higher lactam comprising the steps of filling the mold with a volatile organic material that is soluble in said lactam, volatilizing said organic material to displace the less soluble gases present, charging said mold with said lactam, and polymerizing the lactam in said mold at substantially atmospheric pressures and below the melting point of the polymerized polylactam.

2. A method according to claim 1 in which said volatile material is a ketone.

3. A method according to claim 2 in which said ketone is acetone.

4. A method according to claim 2 in which said ketone is methyl ethyl ketone.

References Cited

UNITED STATES PATENTS

| | | | |
|---|---|---|---|
| 2,305,362 | 12/1942 | Taylor | 264—85 |
| 2,479,727 | 8/1949 | Daniels | 264—85 |
| 3,022,542 | 2/1962 | Davis. | |

ALEXANDER H. BRODMERKEL, *Primary Examiner.*

D. J. ARNOLD, *Assistant Examiner.*